United States Patent
Lin

(10) Patent No.: US 12,479,593 B2
(45) Date of Patent: Nov. 25, 2025

(54) AIRCRAFT AUXILIARY DISPLAY SYSTEM FOR AVOIDING SPATIAL DISORIENTATION

(71) Applicant: Hung-Hsin Lin, Taipei (TW)

(72) Inventor: Hung-Hsin Lin, Taipei (TW)

( * ) Notice: Subject to any disclaimer, the term of this patent is extended or adjusted under 35 U.S.C. 154(b) by 725 days.

(21) Appl. No.: 17/840,638

(22) Filed: Jun. 15, 2022

(65) Prior Publication Data

US 2023/0406534 A1  Dec. 21, 2023

(51) Int. Cl.

| | |
|---|---|
| *B64D 45/00* | (2006.01) |
| *B64D 43/00* | (2006.01) |
| *B64D 47/00* | (2006.01) |
| *B64C 1/14* | (2006.01) |

(52) U.S. Cl.
CPC ............. *B64D 45/00* (2013.01); *B64D 43/00* (2013.01); *B64D 47/00* (2013.01); *B64C 1/1484* (2013.01)

(58) Field of Classification Search
CPC ........ B64D 45/00; B64D 43/00; B64C 1/1484
See application file for complete search history.

(56) References Cited

U.S. PATENT DOCUMENTS

| | | |
|---|---|---|
| 5,798,713 A | 8/1998 | Viebahn et al. |
| 6,028,536 A | 2/2000 | Voulgaris |
| 6,101,431 A | 8/2000 | Niwa et al. |
| 2005/0012642 A1 | 1/2005 | Sacle |
| 2011/0045446 A1 | 2/2011 | Glaser et al. |
| 2011/0193725 A1 | 8/2011 | Wise et al. |
| 2013/0096738 A1 | 4/2013 | Yamasaki |
| 2015/0362332 A1 | 12/2015 | Vernaleken et al. |
| 2016/0264255 A1 | 9/2016 | Connor et al. |
| 2016/0272340 A1 | 9/2016 | Leland |
| 2017/0309060 A1 | 10/2017 | John |
| 2019/0310105 A1 | 10/2019 | Pippard et al. |
| 2020/0386573 A1* | 12/2020 | Lin .................... G05D 1/0808 |
| 2021/0241654 A1* | 8/2021 | Onur .................. G09B 19/165 |

FOREIGN PATENT DOCUMENTS

| | | |
|---|---|---|
| CH | 354587 A | 5/1961 |
| CN | 104298846 A | 1/2015 |
| DE | 1159171 B | 12/1963 |
| DE | 60011572 T2 | 11/2004 |
| DE | 102020114680 A1 | 12/2020 |
| EP | 2669194 A2 | 12/2013 |

OTHER PUBLICATIONS

Taiwan Application Serial No. 111119337, Office Action mailed Dec. 26, 2022 and its translation.

(Continued)

*Primary Examiner* — Aryan E Weisenfeld

(57) ABSTRACT

An aircraft auxiliary display system for avoiding spatial disorientation includes a central processing unit (CPU), a sensing module, an activation display unit and an electro-optical visual unit. The CPU includes a storage unit and is electrically connected to the activation display unit. The sensing module is electrically connected to the CPU and includes a flight data sensing unit. The activation display unit is electrically connected to the electro-optical visual unit.

9 Claims, 4 Drawing Sheets

(56) References Cited

OTHER PUBLICATIONS

Taiwan Application Serial No. 111119337, Office Action mailed Jun. 20, 2023 and its translation.
Taiwan Application Serial No. 111119337, Office Action mailed Dec. 27, 2023 and its translation.
Taiwan Application Serial No. 111119337, Office Action mailed May 30, 2024 and its translation.
Taiwan Application Serial No. 111119337, Notice of Allowance mailed Nov. 25, 2024 and its translation.
Taiwan Application Serial No. 111119337, Claims filed May 24, 2022 and its translation.

* cited by examiner

AIRCRAFT AUXILIARY DISPLAY SYSTEM FOR AVOIDING SPATIAL DISORIENTATION

BACKGROUND OF THE INVENTION

1. Field of the Invention

The present disclosure relates to an aircraft auxiliary display system, and in particular to an aircraft auxiliary display system that assists a pilot to quickly acquire various types of flight information without external interference in order to avoid spatial orientation.

2. Description of the Related Art

An aircraft is an extremely common means of transportation. In general, when taking long trips is needed, vast numbers of travelers may take aircrafts for domestic or international flights that last for several to tens of hours. Thus, flight safety is essentially an important task.

BRIEF SUMMARY OF THE INVENTION

During navigation of an aircraft, a pilot needs to observe through the windshield and a large number of instruments to correctly determine flight information of the aircraft and the relative relationship with various terrains and obstacles on the outside. However, in case of emergencies such as turbulences, harsh weathers or malfunctions of the aircraft, the pilot may not be able to observe correct external information through the windshield of the aircraft and obtain reference points in the three-dimensional space. As a result, the pilot may suffer from spatial disorientation, and this may lead to a momentary loss of control of the aircraft. Before the emergency above is eliminated, such an occurrence poses great flight risks on inexperienced pilots as well as all passengers.

With dedicated research and development, the inventor of the present disclosure provides an aircraft auxiliary display system that assists a pilot to quickly acquire various types of flight information without external interference in order to avoid spatial orientation, in the aim of achieving an effect of enhanced flight safety.

The present disclosure provides an aircraft auxiliary display system for avoiding spatial disorientation. The system includes a central processing unit (CPU), a sensing module, an activation display unit and an electro-optical visual unit. The CPU includes a storage unit and is electrically connected to the activation display unit. The sensing module is electrically connected to the CPU and includes a flight data sensing unit. The flight data sensing unit includes a pitch angle sensor, a roll angle sensor and a yaw angle sensor to sense a pitch angle, a roll angle and a yaw angle of the aircraft, respectively. The activation display unit is electrically connected to the electro-optical visual unit. The activation display unit and the CPU display a virtual aerial environment image and a virtual terrestrial environment image on the electro-optical visual unit according to at least one of the pitch angle greater than a pitch angle standard threshold, the roll angle greater than a roll angle standard threshold and the yaw angle greater than a yaw angle standard threshold. The virtual aerial environment image and the virtual terrestrial environment image correspond to the pitch angle, the roll angle and the yaw angle. The pitch angle standard threshold, the roll angle standard threshold and the yaw angle standard threshold are stored in the storage unit.

In one embodiment, the activation display unit and the CPU can display a virtual aircraft image on the electro-optical visual unit according to at least one of the pitch angle greater than the pitch angle standard threshold, the roll angle greater than the roll angle standard threshold and the yaw angle greater than the yaw angle standard threshold. A flight attitude of the virtual aircraft image corresponds to the pitch angle, the roll angle and the yaw angle, and the virtual aircraft image is stored in the storage unit.

In one embodiment, the activation display unit and the CPU display a flight attitude indicator image on the electro-optical visual unit according to at least one of the pitch angle greater than the pitch angle standard threshold, the roll angle greater than the roll angle standard threshold and the yaw angle greater than the yaw angle standard threshold. A flight attitude presented by the flight attitude indicator image corresponds to the pitch angle, the roll angle and the yaw angle, and the flight attitude indicator image is stored in the storage unit.

In one embodiment, the virtual aerial environment image and the virtual terrestrial environment image are stored in the storage unit. Alternatively, the virtual aerial environment image and the virtual terrestrial environment image are acquired by at least one image sensor outside the aircraft, wherein the image sensor is electrically connected to the CPU.

In one embodiment, the sensing module can include an aerial obstacle sensing unit. The aerial obstacle sensing unit senses a relative distance between an aerial obstacle and the aircraft. The activation display unit and the CPU display a virtual aircraft image, the virtual aerial environment image, the virtual terrestrial environment image and a virtual aerial obstacle image on the electro-optical visual unit according to the relative distance smaller than a relative distance standard threshold. A flight attitude of the virtual aircraft image corresponds to the pitch angle, the roll angle and the yaw angle. A relative distance between the virtual aircraft image and the virtual aerial obstacle image corresponds to the relative distance. The virtual aircraft image, the virtual aerial obstacle image and the relative distance standard threshold are stored in the storage unit.

In one embodiment, the sensing module can include a terrestrial obstacle sensing unit. The terrestrial obstacle sensing unit senses a relative altitude between a terrestrial obstacle and the aircraft. The activation display unit and the CPU display a virtual aircraft image, the virtual aerial environment image, the virtual terrestrial environment image and a virtual terrestrial obstacle image on the electro-optical visual unit according to the relative altitude smaller than a relative altitude standard threshold. A flight attitude of the virtual aircraft image corresponds to the pitch angle, the roll angle and the yaw angle. A relative altitude between the virtual aircraft image and the virtual terrestrial obstacle image corresponds to the relative altitude. The virtual aircraft image, the virtual terrestrial obstacle image and the relative altitude standard threshold are stored in the storage unit.

In one embodiment, the electro-optical visual unit can be arranged at a windshield of the aircraft, can include a protection device, and is electrically connected to the activation display unit. The activation display unit and the CPU adjust a luminous flux of the electro-optical visual unit according to at least one of the pitch angle greater than the pitch angle standard threshold, the roll angle greater than the roll angle standard threshold and the yaw angle greater than the yaw angle standard threshold, so that the projection device projects the virtual aerial environment image and the virtual terrestrial environment image on the electro-optical visual unit.

In one embodiment, the electro-optical visual unit can be arranged at a windshield of the aircraft. The activation display unit and the CPU adjust a luminous flux of the electro-optical visual unit according to at least one of the pitch angle greater than the pitch angle standard threshold, the roll angle greater than the roll angle standard threshold and the yaw angle greater than the yaw angle standard threshold, so as to display the virtual aerial environment image and the virtual terrestrial environment image on an electronic display layer of the electro-optical visual unit.

In one embodiment, the electro-optical visual unit can be an auxiliary display device, and can be arranged in a cockpit of the aircraft. The activation display unit and the CPU display the virtual aerial environment image and the virtual terrestrial environment image on the electro-optical visual unit according to at least one of the pitch angle greater than the pitch angle standard threshold, the roll angle greater than the roll angle standard threshold and the yaw angle greater than the yaw angle standard threshold.

Accordingly, the aircraft auxiliary display system for avoiding spatial orientation of the present disclosure can display, by the activation display unit and the CPU, the virtual aircraft image, the virtual aerial environment image and the virtual terrestrial environment image on the electro-optical visual unit according to at least one of the pitch angle greater than the pitch angle standard threshold, the roll angle greater than the roll angle standard threshold and the yaw angle greater than the yaw angle standard threshold. Therefore, the pilot is allowed to quickly acquire various types of flight information without external interference, thereby achieving the effect of enhanced flight safety.

To better understand the features and advantages of the present disclosure above, embodiments are described in detail with the accompanying drawings below.

DETAILED DESCRIPTION OF THE INVENTION

The above and other technical contents, features and effects of the present disclosure can be clearly presented in the detailed description of the preferred embodiments with reference to the accompanying drawings below. It should be noted that, the directional terms used in the embodiments below, for example, upper, lower, left, right, front and back are given with reference to the directions of the accompanying drawings. Thus, the directional terms are used for illustration purposes and are not to be construed as limitations to the present disclosure. Moreover, in the embodiments below, the same or similar elements are represented by the same or similar denotations or numerals. In addition, in FIG. 2 to FIG. 4, the sun, moon, cloud and the like in a virtual aerial environment image 238, the mountain, river, trees and the like in a virtual terrestrial environment image 226, other aircrafts in a virtual aerial obstacle image 216 and buildings in a virtual terrestrial obstacle image 224 are presented as examples, and are not limited to being presented all at the same time.

Figure 1:
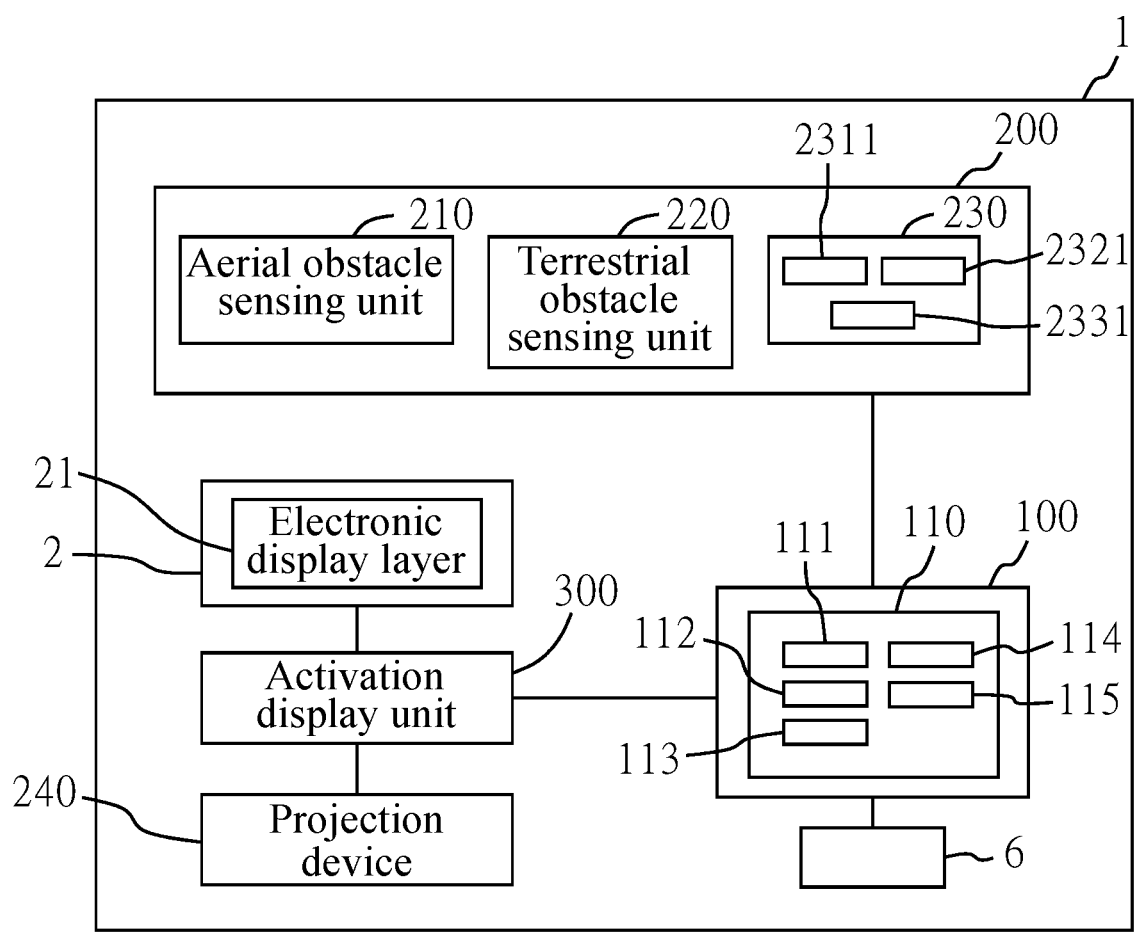
FIG. 1 is a structural block diagram of an aircraft auxiliary display system for avoiding spatial orientation according to an embodiment of the present disclosure.
Figure 2:
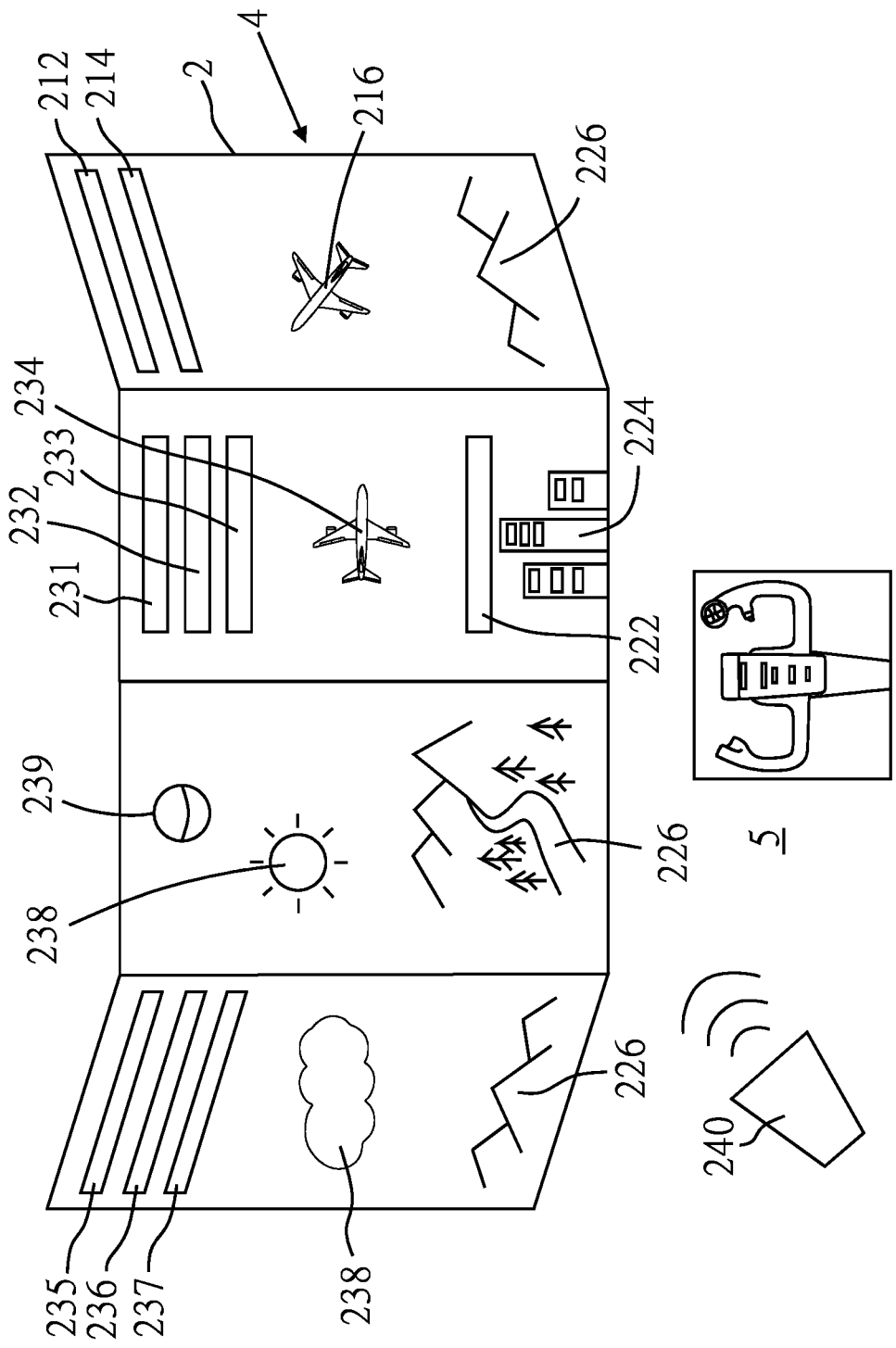
FIG. 2 is a first schematic diagram of an aircraft auxiliary display system for avoiding spatial orientation of the present disclosure.

Referring to FIG. 1 and FIG. 2, as shown in the drawings, an aircraft auxiliary display system 1 for avoiding spatial orientation according to this embodiment is suitable for an aircraft. The aircraft can be a private civil aircraft, a commercial civil aircraft, a military aircraft, or other aircraft that can be airborne. The aircraft auxiliary display system 1 of this embodiment includes a central processing unit (CPU, for example, a central processor, or a processing circuit or a processing chip including a central processor) 100, a sensing module 200, an activation display unit 300 (for example, an activation display chip or an activation display circuit) and an electro-optical visual unit 2 (for example, a display). The CPU 100 includes a storage unit 110 (for example, a memory or a hard drive) and is electrically connected to the activation display unit 300. The sensing module 200 is electrically connected to the CPU 100 and includes a flight data sensing unit 230. The flight data sensing unit 230 includes a pitch angle sensor 2311, a roll angle sensor 2321 and a yaw angle sensor 2331 to sense a pitch angle 231, a roll angle 232 and a yaw angle 233 of the aircraft, respectively. The activation display unit 300 is electrically connected to the electro-optical visual unit 2. The activation display unit 300 and the CPU 100 display a virtual aerial environment image 238 and a virtual terrestrial environment image 226 on the electro-optical visual unit 2 according to at least one of the pitch angle 231 greater than a pitch angle standard threshold 111, the roll angle 232 greater than a roll angle standard threshold 112 and the yaw angle 233 greater than a yaw angle standard threshold 113. The virtual aerial environment image 238 and the virtual terrestrial environment image 226 correspond to the pitch angle 231, the roll angle 232 and the yaw angle 233. The pitch angle standard threshold 111, the roll angle standard threshold 112 and the yaw angle standard threshold 113 are stored in the storage unit 110. Moreover, the virtual aerial environment image 238 and the virtual terrestrial environment image 226 are environment images of a flight route of the aircraft, and can be captured in advance or be rendered and then stored in the storage unit 110. Alternatively, the virtual aerial environment image 238 and the virtual terrestrial environment image 226 can be acquired by an image sensor 6 outside the aircraft, wherein the image sensor 6 is electrically connected to the CPU 100 and the number of the image sensor 6 may be one or more.

More specifically, during the navigation performed by a pilot in a cockpit of the aircraft under normal flight circumstances, the pilot can observe correct external information through a windshield 4 of the aircraft, for example, reference points in the three-dimensional space, weather conditions and the relative orientation. However, in case of emergencies such as turbulences, harsh weathers or thick clouds, the pilot may not be able to observe correct external information through the windshield 4 of the aircraft and obtain reference points in the three-dimensional space. As a result, the pilot may suffer from spatial disorientation and operate (or control) the aircraft improperly, and this may cause the aircraft to go beyond a safe flight angle and lead to a momentary loss of control. At this point in time, the activation display unit 300 and the CPU 100 calculate whether the pitch angle 231 is greater than the pitch angle standard threshold 111, whether the roll angle 232 is greater than the roll angle standard threshold 112, and whether the yaw angle 233 is greater than the yaw angle standard threshold 113. When at least one of the pitch angle 231 greater than the pitch angle standard threshold 111, the roll angle 232 greater than the roll angle standard threshold 112, and the yaw angle 233 greater than the yaw angle standard threshold 113 occurs, the activation display unit 300 and the CPU 100 then display the virtual aerial environment image 238 and the virtual terrestrial environment image 226 on the electro-optical visual unit 2. With the electro-optical visual unit 2 capable of displaying the virtual aerial environment image 238 and the virtual terrestrial environment image 226, the pilot can be free from the interference of invalid external information, and the pilot provided with the external information through the electro-optical visual unit 2 can also be provided by the images displayed with reference points for maneuvering the aircraft and so the pilot can quickly learn various types of flight information. Thus, the pilot can perform proper maneuvers and calibrations in response to flight conditions to prevent spatial disorientation, further achieving the effect of enhanced flight safety.

Moreover, when at least one of the pitch angle 231 greater than the pitch angle standard threshold 111, the roll angle 232 greater than the roll angle standard threshold 112, and the yaw angle 233 greater than the yaw angle standard threshold 113 occurs, the activation display unit 300 and the CPU 100 can also display a virtual aircraft image 234 or a flight attitude indicator image 239 on the electro-optical visual unit 2. A flight attitude of the virtual aircraft image 234 corresponds to the pitch angle 231, the roll angle 232 and the yaw angle 233. A flight attitude presented by the flight attitude indicator image 239 corresponds to the pitch angle 231, the roll angle 232 and the yaw angle 233. The virtual aircraft image 234 or the flight attitude indicator image 239 can be stored in the storage unit 110. Thus, with the virtual aircraft image 234 or the flight attitude indicator image 239, the pilot can further achieve the effect of enhanced maneuver safety.

Again referring to FIG. 1 and FIG. 2, as shown in the drawings, in one embodiment, the above emergencies can include a case where a flying object such as other aircrafts or birds fast approaching the aircraft mounted with the aircraft auxiliary display system 1. In response to such emergencies, the sensing module 200 can include an aerial obstacle sensing unit 210 (for example, an aerial obstacle sensor or a Doppler radar configured on the nose and two side wings of the aircraft), and data transmitted by the aerial obstacle sensing unit 210 includes a relative distance and a relative speed between an aerial obstacle and the aircraft. Once the data is received by the CPU 100, the activation display unit 300 and the CPU 100 calculate whether the relative distance is smaller than a relative distance standard threshold 114. When the relative distance is smaller than the relative distance standard threshold 114, the activation display unit 300 and the CPU 100 then display a relative distance 212, a relative speed 214, the virtual aircraft image 234, the virtual aerial environment image 238, the virtual terrestrial environment image 226 and the virtual aerial obstacle image 216 on the electro-optical visual unit 2. A flight attitude of the virtual aircraft image 234 corresponds to the pitch angle 231, the roll angle 232 and the yaw angle 233, a relative distance between the virtual aircraft image 234 and the virtual aerial obstacle image 216 corresponds to the relative distance 212, and a relative speed between the virtual aircraft image 234 and the virtual aerial obstacle image 216 corresponds to the relative speed 214. The virtual aircraft image 234, the virtual aerial obstacle image 216 and the relative distance standard threshold 114 are stored in the storage unit 110. Thus, upon seeing the relative distance 212, the relative speed 214, the virtual aircraft image 234, the virtual aerial environment image 238, the virtual terrestrial environment image 226 and the virtual aerial obstacle image 216, the pilot can be quickly aware of the approaching aerial obstacle to thereby adjust the flight direction of the aircraft to dodge the aerial obstacle.

Again referring to FIG. 1 and FIG. 2, as shown in the drawings, in one embodiment, the aircraft may be close to obstacles below the aircraft during a flight, such as high mountains and skyscrapers. To prevent these obstacles from affecting flight safety, the sensing module 200 can include a terrestrial obstacle sensing unit 220 (for example, a terrestrial obstacle sensor or an image sensor configured at a position at the bottom of the nose or near landing gears of the aircraft), and data transmitted by the terrestrial obstacle sensing unit 220 includes a relative altitude between a terrestrial obstacle and the aircraft. Once the data is received by the CPU 100, the activation display unit 300 and the CPU 100 calculate whether the relative altitude is smaller than a relative altitude standard threshold 115. When the relative altitude is smaller than the relative altitude standard threshold 115, the activation display unit 300 and the CPU 100 then display a relative altitude 222, the virtual aircraft image 234, the virtual aerial environment image 238, the virtual terrestrial environment image 226 and the virtual terrestrial obstacle image 224 on the electro-optical visual unit 2. The flight attitude of the virtual aircraft image 234 corresponds to the pitch angle 231, the roll angle 232 and the yaw angle 233, and the relative altitude between the virtual aircraft image 234 and the virtual terrestrial obstacle image 224 corresponds to the relative altitude 222. The virtual aircraft image 234, the virtual terrestrial obstacle image 224 and the relative altitude standard threshold 115 are stored in the storage unit 110. Thus, upon seeing the relative altitude 222, the virtual aircraft image 234, the virtual aerial environment image 238, the virtual terrestrial environment image 226 and the virtual terrestrial obstacle image 224, the pilot can quickly learn whether a safety distance is kept between the aircraft and the terrestrial obstacle to thereby dynamically adjust the altitude of the aircraft in response.

Figure 3:
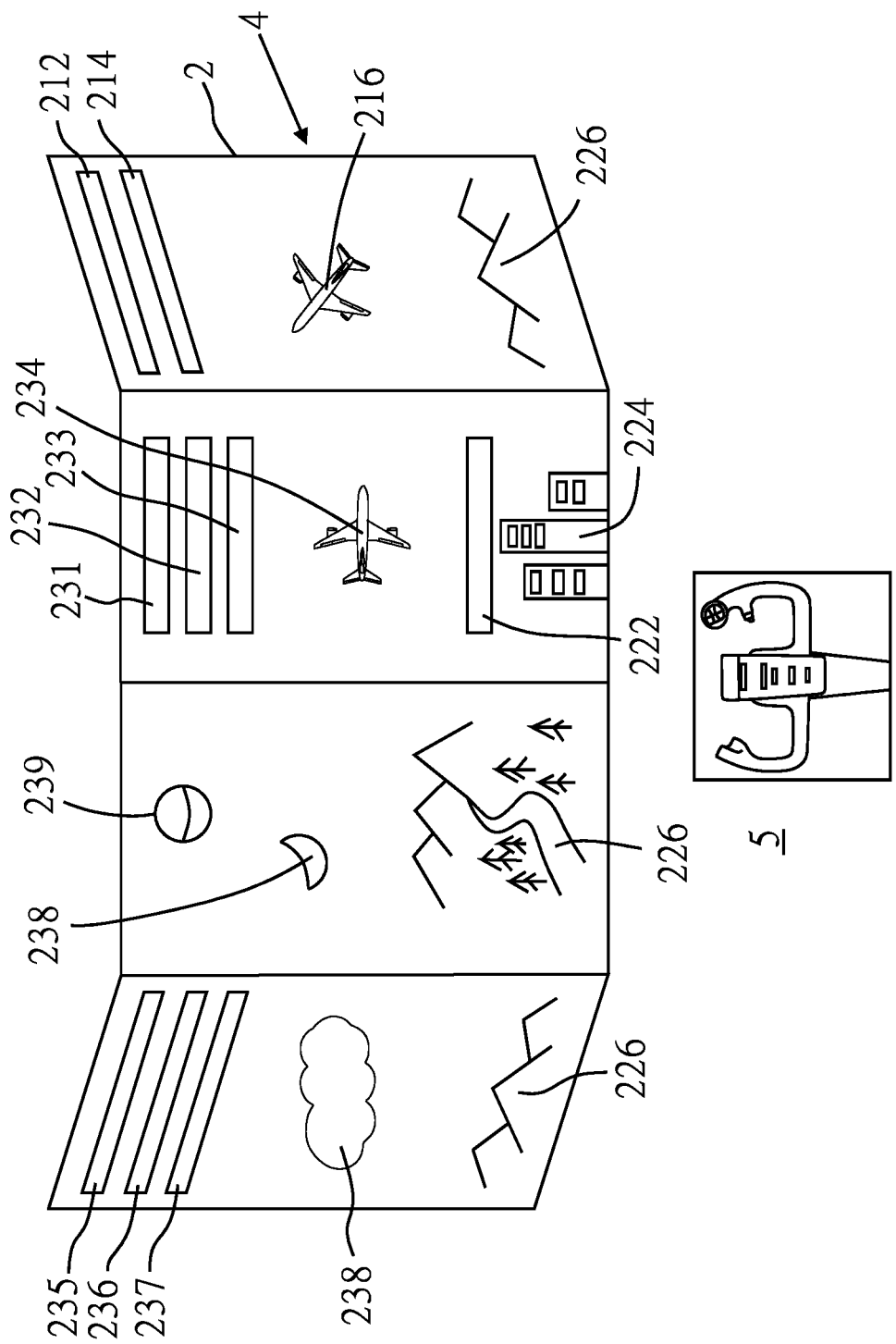
FIG. 3 is a second schematic diagram of an aircraft auxiliary display system for avoiding spatial orientation of the present disclosure.
Figure 4:
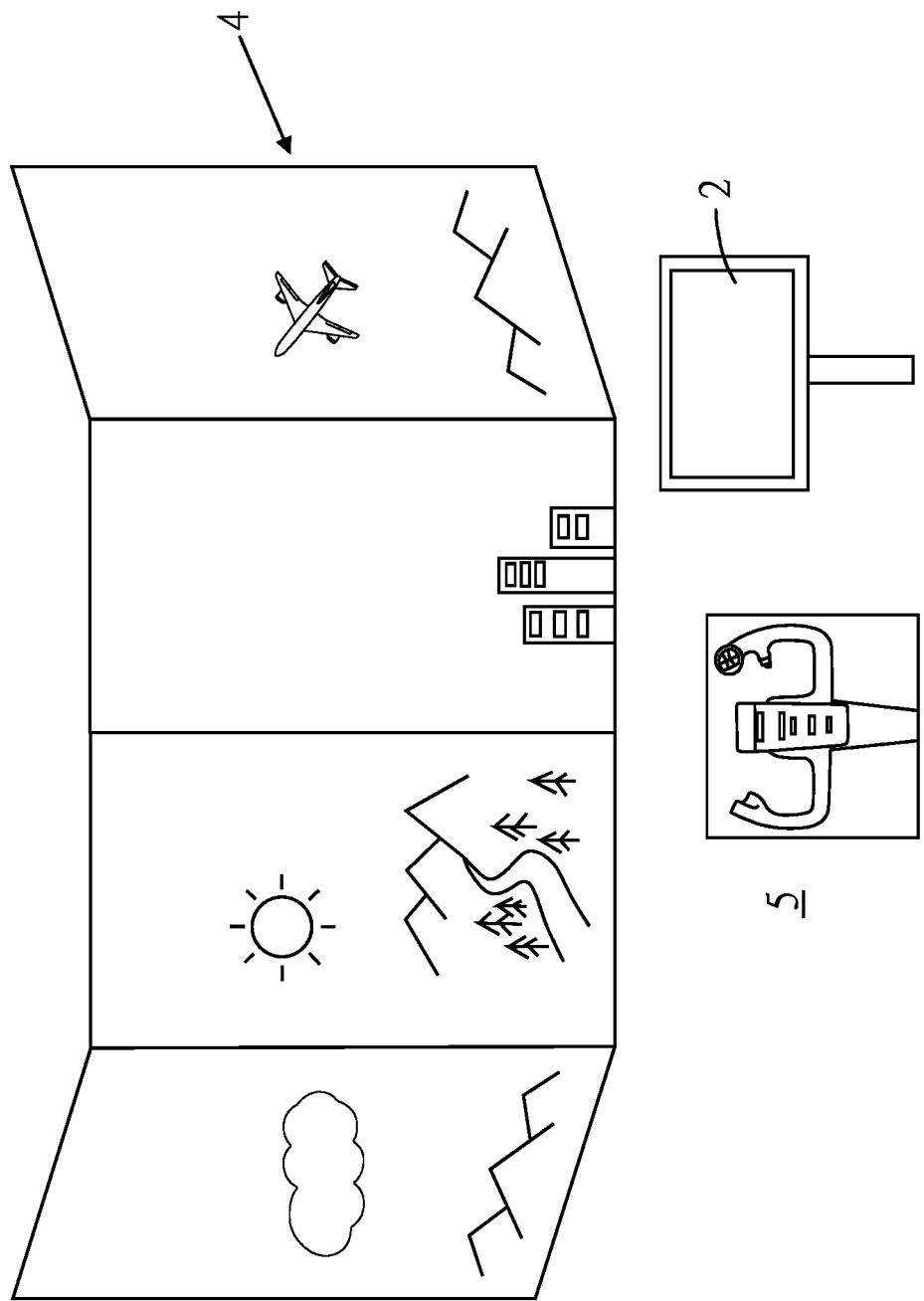
FIG. 4 is a third schematic diagram of an aircraft auxiliary display system for avoiding spatial orientation of the present disclosure.

Again referring to FIG. 2, as shown in the drawing, in one embodiment, to ensure that the aircraft is maintained on the correct flight route and maintained at a stable flight speed and altitude, the flight data sensing unit 230 can further include a direction sensor, a speed sensor, an altitude sensor and a weather sensor, and the data transmitted by the flight data sensing unit 230 further includes a flight direction, a flight speed, a flight altitude and weather data of a flight environment of the aircraft. Once the CPU 100 receives the above data, the activation display unit 300 and the CPU 100 can assist in displaying orientation information 235 corresponding to the flight direction, a speed 236 corresponding to the flight speed, an altitude 237 corresponding to the flight altitude and a weather condition image correspondingly formed according to the weather data on the electro-optical visual unit 2. The weather condition image is stored in the storage unit 110. Thus, the pilot can quickly determine according to the orientation information 235, the speed 236, the altitude 237 and the weather condition image whether the aircraft is cruising on the correct route to reduce the loading on the pilot. Moreover, the electro-optical visual unit 2 can also display the daytime with sunshine as shown in FIG. 2 or nighttime with moonlight as shown in FIG. 3, for the image displayed by the electro-optical visual unit 2 to better meet a manipulation environment of the pilot.

Again referring to FIG. 1 and FIG. 2, as shown in the drawings, in one embodiment, the electro-optical visual unit 2 can be arranged on a windshield 4 of the aircraft (for example, the electro-optical visual unit 2 can overlap the windshield 4 and be located in the cockpit 5 of the aircraft, or the electro-optical visual unit 2 can be arranged inside the windshield 4, or the electro-optical visual unit 2 can be arranged as the windshield 4). Moreover, the electro-optical visual unit 2 can be an electronic display panel with a variable luminous flux, includes a projection device 240, and is electrically connected to the activation display unit 300. The activation display unit 300 and the CPU 100 adjust the luminous flux of the electro-optical visual unit 2 according to at least one of the pitch angle 231 greater than the pitch angle standard threshold 111, the roll angle 232 greater than the roll angle standard threshold 112 and the yaw angle 233 greater than the yaw angle standard threshold 113 (for example, reducing the luminous flux so that external light of the aircraft does not affect the readability of images), so that the projection device 240 projects the virtual aircraft image 234, the virtual aerial environment image 238 and the virtual terrestrial environment image 226 on the electro-optical visual unit 2. Thus, when there are no emergencies of the aircraft, the pilot can navigate the aircraft through the electro-optical visual unit 2 and the windshield 4; in case of emergencies of the aircraft, the pilot can navigate the aircraft through the electro-optical visual unit 2. Moreover, the electro-optical visual unit 2 of this embodiment is also suitable for case of emergencies of an aerial obstacle or case of emergencies of a terrestrial obstacle.

Again referring to FIG. 1 and FIG. 3, as shown in the drawings, in one embodiment, the electro-optical visual unit 2 can be arranged on the windshield 4 of the aircraft (for example, the electro-optical visual unit 2 can overlap the windshield 4 and be located in the cockpit 5 of the aircraft, or the electro-optical visual unit 2 can be arranged inside the windshield 4, or the electro-optical visual unit 2 can be arranged as the windshield 4). Moreover, the electro-optical visual unit 2 can be an electronic display panel with a variable luminous flux, includes an electronic display layer 21 (for example, an electronic display film), and is electrically connected to the activation display unit 300. The activation display unit 300 and the CPU 100 adjust the luminous flux of the electro-optical visual unit 2 according to at least one of the pitch angle 231 greater than the pitch angle standard threshold 111, the roll angle 232 greater than the roll angle standard threshold 112 and the yaw angle 233 greater than the yaw angle standard threshold 113 (for example, reducing the luminous flux so that external light of the aircraft does not affect the readability of images), so as to display the virtual aircraft image 234, the virtual aerial environment image 238 and the virtual terrestrial environment image 226 on the electronic display layer 21 of the electro-optical visual unit 2. Thus, when there are no emergencies of the aircraft, the pilot can navigate the aircraft through the electro-optical visual unit 2 and the windshield 4; in case of emergencies of the aircraft, the pilot can navigate the aircraft through the electro-optical visual unit 2. Moreover, the electro-optical visual unit 2 of this embodiment is also suitable for case of emergencies of an aerial obstacle or case of emergencies of a terrestrial obstacle.

Again referring to FIG. 1 and FIG. 4, as shown in the drawings, in one embodiment, the electro-optical visual unit 2 can be an auxiliary display device (for example, an auxiliary display), and is configured in the cockpit 5 of the aircraft. The activation display unit 300 and the CPU 100 display the virtual aircraft image 234, the virtual aerial environment image 238 and the virtual terrestrial environment image 226 on the electro-optical visual unit 2 (for example, by the display means of the electro-optical visual unit 2 in FIG. 3) according to at least one of the pitch angle 231 greater than the pitch angle standard threshold 111, the roll angle 232 greater than the roll angle standard threshold 112 and the yaw angle 233 greater than the yaw angle standard threshold 113. Thus, when there are no emergencies of the aircraft, the pilot can navigate the aircraft through the windshield 4; in case of emergencies of the aircraft, the pilot can navigate the aircraft through the electro-optical visual unit 2. Moreover, the electro-optical visual unit 2 of this embodiment is also suitable for case of emergencies of an aerial obstacle or case of emergencies of a terrestrial obstacle.

The present disclosure is described by way of the preferred embodiments above. A person skilled in the art should understand that, these embodiments are merely for illustrating the present disclosure and are not to be construed as limitations to the scope of the present disclosure. It should be noted that all equivalent changes, replacements and substitutions made to the embodiments are to be encompassed within the scope of the present disclosure. Therefore, the scope of legal protection of the present disclosure should be defined by the appended claims.

What is claimed is:

1. An aircraft auxiliary display system for avoiding space disorientation, the system comprising:
    a central processing unit (CPU), comprising a storage unit, wherein the CPU is a central processor, or a processing circuit or a processing chip including a central processor; and the storage unit is a memory or a hard drive;
    a sensing module, electrically connected to the CPU, comprising:
        a flight data sensing unit, comprising a pitch angle sensor, a roll angle sensor and a yaw angle sensor to sense a pitch angle, a roll angle and a yaw angle of the aircraft, respectively;
    an activation display unit, electrically connected to the CPU, wherein the activation display unit is an activation display chip or an activation display circuit; and
    an electro-optical visual unit, electrically connected to the activation display unit, wherein the electro-optical visual unit is a display;
        wherein when at least one of the pitch angle greater than a pitch angle standard threshold, the roll angle greater than a roll angle standard threshold and the yaw angle greater than a yaw angle standard threshold occurs, the activation display unit and the CPU then display a virtual aerial environment image and a virtual terrestrial environment image on the electro-optical visual unit, wherein the virtual aerial environment image and the virtual terrestrial environment image correspond to the pitch angle, the roll angle and the yaw angle, and the pitch angle standard threshold, the roll angle standard threshold and the yaw angle standard threshold are stored in the storage unit.

2. The aircraft auxiliary display system according to claim 1, wherein the activation display unit and the CPU display a virtual aircraft image on the electro-optical visual unit according to at least one of the pitch angle greater than the pitch angle standard threshold, the roll angle greater than the roll angle standard threshold and the yaw angle greater than the yaw angle standard threshold, wherein a flight attitude of the virtual aircraft image corresponds to the pitch angle, the roll angle and the yaw angle, and the virtual aircraft image is stored in the storage unit.

3. The aircraft auxiliary display system according to claim 1, wherein the activation display unit and the CPU display a flight attitude indicator image on the electro-optical visual unit according to at least one of the pitch angle greater than the pitch angle standard threshold, the roll angle greater than the roll angle standard threshold and the yaw angle greater than the yaw angle standard threshold, wherein a flight attitude presented by the flight attitude indicator image corresponds to the pitch angle, the roll angle and the yaw angle, and the flight attitude indicator image is stored in the storage unit.

4. The aircraft auxiliary display system according to claim 1, wherein the virtual aerial environment image and the virtual terrestrial environment image are stored in the storage unit; alternatively, the virtual aerial environment image and the virtual terrestrial environment image are acquired by at least one image sensor outside the aircraft, wherein the image sensor is electrically connected to the CPU.

5. The aircraft auxiliary display system according to claim 1, wherein the sensing module comprises an aerial obstacle sensing unit; the aerial obstacle sensing unit is an aerial obstacle sensor or a Doppler radar; the aerial obstacle sensing unit senses a relative distance between an aerial obstacle and the aircraft; the activation display unit and the CPU display a virtual aircraft image, the virtual aerial environment image, the virtual terrestrial environment image and a virtual aerial obstacle image on the electro-optical visual unit according to the relative distance smaller than a relative distance standard threshold; a flight attitude of the virtual aircraft image corresponds to the pitch angle, the roll angle and the yaw angle; a relative distance between the virtual aircraft image and the virtual aerial obstacle image corresponds to the relative distance; and the virtual aircraft image, the virtual aerial obstacle image and the relative distance standard threshold are stored in the storage unit.

6. The aircraft auxiliary display system according to claim 1, wherein the sensing module comprises a terrestrial obstacle sensing unit; the terrestrial obstacle sensing unit is a terrestrial obstacle sensor or an image sensor; the terrestrial obstacle sensing unit senses a relative altitude between a terrestrial obstacle and the aircraft; the activation display unit and the CPU display a virtual aircraft image, the virtual aerial environment image, the virtual terrestrial environment image and a virtual terrestrial obstacle image on the electro-optical visual unit according to the relative altitude smaller than a relative altitude standard threshold; a flight attitude of the virtual aircraft image corresponds to the pitch angle, the roll angle and the yaw angle; a relative altitude between the virtual aircraft image and the virtual terrestrial obstacle image corresponds to the relative altitude; and the virtual aircraft image, the virtual terrestrial obstacle image and the relative altitude standard threshold are stored in the storage unit.

7. The aircraft auxiliary display system according to claim 1, wherein the electro-optical visual unit is arranged at a windshield of the aircraft, comprises a protection device and is electrically connected to the activation display unit; and the activation display unit and the CPU adjust a luminous flux of the electro-optical visual unit according to at least one of the pitch angle greater than the pitch angle standard threshold, the roll angle greater than the roll angle standard threshold and the yaw angle greater than the yaw angle standard threshold, so that the projection device projects the virtual aerial environment image and the virtual terrestrial environment image on the electro-optical visual unit.

8. The aircraft auxiliary display system according to claim 1, wherein the electro-optical visual unit is arranged at a windshield of the aircraft, and the activation display unit and the CPU adjust a luminous flux of the electro-optical visual unit according to at least one of the pitch angle greater than the pitch angle standard threshold, the roll angle greater than the roll angle standard threshold and the yaw angle greater than the yaw angle standard threshold, so as to display the virtual aerial environment image and the virtual terrestrial environment image on an electronic display layer of the electro-optical visual unit; and wherein the electronic display layer is an electronic display film.

9. The aircraft auxiliary display system according to claim 1, wherein the electro-optical visual unit is an auxiliary display device and is arranged in a cockpit of the aircraft, and the activation display unit and the CPU display the virtual aerial environment image and the virtual terrestrial environment image on the electro-optical visual unit according to at least one of the pitch angle greater than the pitch angle standard threshold, the roll angle greater than the roll angle standard threshold and the yaw angle greater than the yaw angle standard threshold.

* * * * *